United States Patent [19]
Stoll et al.

[11] 3,794,075
[45] Feb. 26, 1974

[54] MULTIWAY VALVE

[76] Inventors: Kurt Stoll, Schanbacher Str. 48, Esslingen-Hegensberg; Willy Schwenk, Fuchshofstr. 28, Ludwigsburg, both of Germany

[22] Filed: Aug. 3, 1971

[21] Appl. No.: 168,680

[30] Foreign Application Priority Data
Aug. 5, 1970   Germany.............................. 2038846

[52] U.S. Cl................ 137/625.66, 251/75, 251/333, 251/DIG. 1, 137/625.27
[51] Int. Cl........................ F16k 11/02, F16k 31/165
[58] Field of Search..... 137/625.66, 625.64, 625.27; 251/75, 333

[56] References Cited
UNITED STATES PATENTS

| | | | |
|---|---|---|---|
| 3,542,289 | 11/1970 | Ojala et al. ................. | 137/625.66 X |
| 3,548,879 | 12/1970 | Wilde.............................. | 137/625.66 X |
| 3,504,849 | 4/1970 | Quinn ............................... | 251/75 X |
| 3,042,072 | 7/1962 | Humphrey et al. ......... | 137/625.66 X |
| 2,920,653 | 1/1960 | Wolff............................... | 251/333 X |
| 3,384,122 | 5/1968 | Harpman ........................ | 137/625.64 |
| 3,623,695 | 11/1971 | Hislop........................... | 137/625.66 X |

*Primary Examiner*—Henry T. Klinksiek

[57] ABSTRACT

A multiple way valve includes a housing having a central bore and a plurality of passages opening from the outside into the bore. The bore includes a plurality of valve seats between the different passages. A valve member in the shape of a spool carries annular sealing members engageable with the valve seats is floatingly supported within the bore by a support diaphragm at one end and a support diaphgram or a coil spring at the other end. A control diaphragm outside of the support diaphragm forms one wall of a chamber within the housing to which pressure fluid can be admitted. This diaphgram has a boss which is engageable with the spool forming member and actuates it.

One of the diaphragms is constructed as a snap-action diaphragm, so that the valve member will move quickly from one end position to the other.

6 Claims, 4 Drawing Figures

INVENTOR.
KURT STOLL
WILLI SCHWENK
BY Jennings Bailey, Jr

INVENTOR.
KURT STOLL
WILLI SCHWENK
BY
Jennings Bailey Jr

MULTIWAY VALVE

BACKGROUND OF THE INVENTION

1. Field of the Invention

The invention relates to a multiway valve of the kind having an elongated valve member which is axially movable in and relative to a housing, said valve member carrying annular or disc-like seals which serve intermittently to seal off from each other ports provided in the housing for a pressure-medium supply, for connection to operational pipes leading to consumer points and to exhaust pipes, dependent upon the position at any moment of the valve member.

2. The Prior Art

Known arrangements of the above mentioned kind have a disadvantage in that either they have sliding surfaces, and therefore parts liable to wear, which need regular lubrication in order to have a satisfactory working life, or they necessitate a relatively high outlay on parts, entailing high manufacturing costs.

SUMMARY OF THE INVENTION

An object of the present invention is to provide a multiway valve in which said disadvantage is obviated or mitigated.

According to the present invention, the valve member is supported in a floating fashion in the region of its ends within a bore in a housing, so that it can move to-and-fro in a frictionless manner, the valve member being secured in the region of one of its ends by a support diaphragm whose outer circumference is attached to the housing, and whose central region is attached to the valve member, and said diaphragm closing the bore from the outside, while the valve member is secured in the region of its other end flexibly in all directions, the bore, when there are $n$ paths to be controlled, having $n - 1$ valve seats coaxially surrounding the valve member with a degree of play, with which are associated $n - 2$ sealing rings attached to the valve member, of which one ring is formed as a double-seat closure member, or $n - 1$ sealing rings attached to the valve member, if all the sealing rings are formed as single-seat closure members, at least one control diaphragm being provided for the valve member, said control diaphragm forming a movable wall of a control chamber communicating with a control pipe to the side of the diaphragm facing away from the bore, and being capable of being subjected to the control pressure; the valve member is fixable in both its end-positions without frictional effect by a snap action of a diaphragm connected to the valve member and to the housing, the last-mentioned diaphragm being so designed that it moves with a snap action from one of its end-positions into the other under the influence of the control pressure.

The valve is of relatively simple design, and performs excellently. The valve member makes use of the principle of the disc plane seal, the switching force being entirely removed from the individual disc elements. As these disc elements ensure a reliable sealing effect, there is practically no risk of loss through leakage. The valve member is supported in a floating fashion, there is practically no sliding friction, so that no signs of wear appear, and the life duration is accordingly long. The storage function is achieved by the novel snap action; only two end-positions are provided, and there is no middle position. An accurately measured retaining force can be provided for every operational pressure, and only small control pressures are necessary. For this reason, the otherwise frequently used amplifiers are not usually needed. Because of the small switch-over travel, and the small masses to be moved, switch-on times are very short (maximum 6 milliseconds), so that, in practice, the valve acts more rapidly than an electromagnetic valve. The valve needs no lubrication, as there are no moving contact surfaces, so that fewer errors in use can arise, and servicing costs are low. The valve also has practically no sensitivity to temperature, not even when operating at high frequency. Nor is the so-called "Monday morning effect" or slugishness to be found here, because there are no fitting surfaces or static friction. Finally, the manufacturing costs are low, as the valve is made up of few parts, and these are easy to manufacture.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
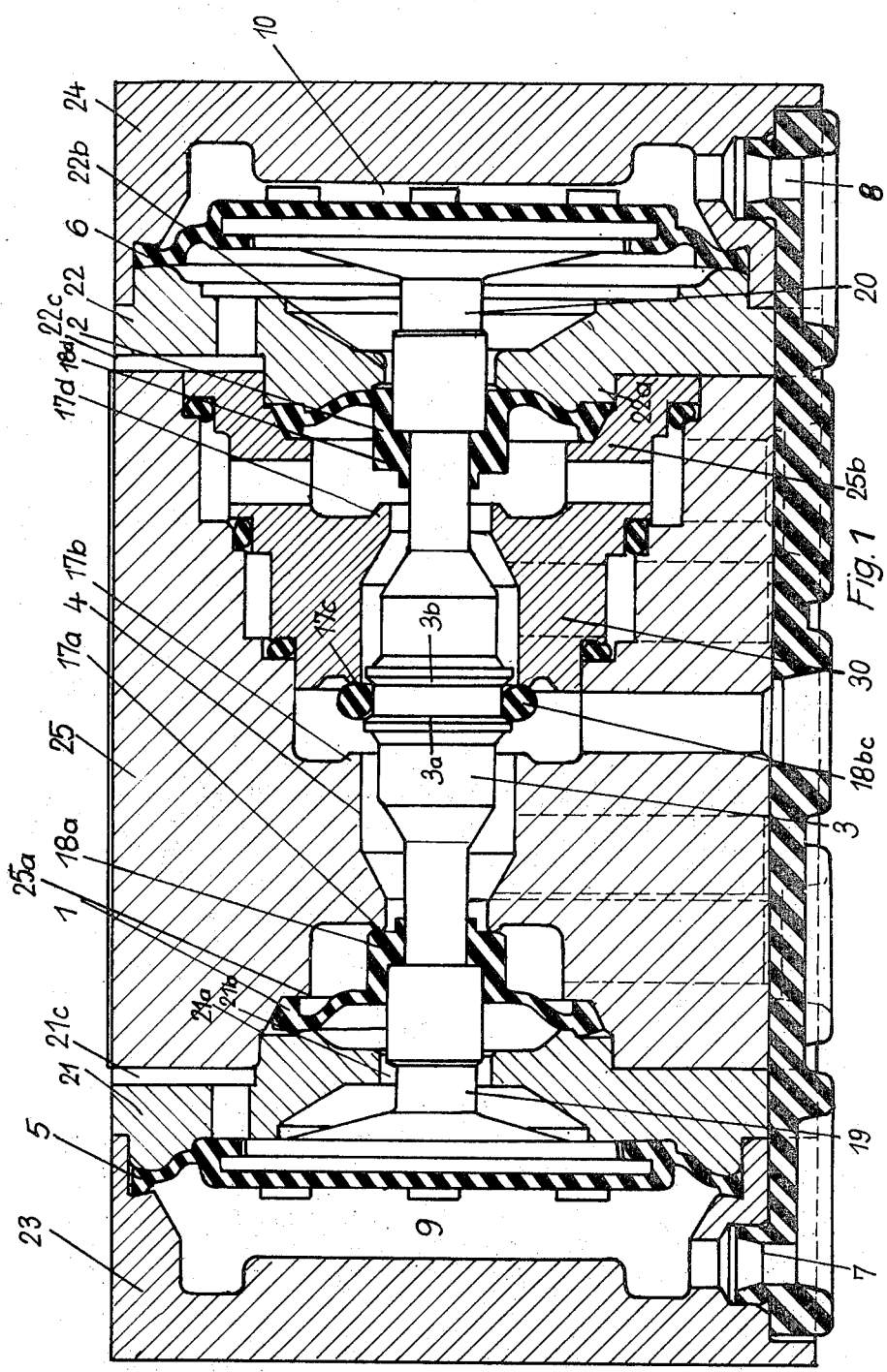
FIG. 1 shows an axial sectional view of one embodiment of a valve according to the invention.

A multiway valve, FIG. 1, has support diaphragms 1,2 adjacent both ends of a spool 3, and supporting the spool 3 in a floating fashion within a central bore 7 in a housing 25 to be described later, so that it can move to and fro axially without friction. The diaphragms 1,2 are attached to the housing at their outer circumference and centrally to the spool 3, and close the bore 4 at its ends. Diaphragms 5,6 are provided in front of the diaphragms 1,2 at the axial ends of the housing 25. The diaphragms 5,6 control and actuate the spool 3 under the action of a control pressure. The control diaphragms 5,6 respectively form the movable walls of control spaces 9,10, communicating with control pipes 7,8 respectively leading to the side of the diaphragms 5,6 facing away from bore 4. Measures are taken to ensure that the spool 3 can be fixed in either end-position without frictional effect by the snap action of a diaphragm attached to the spool and stretched with its outer circumference on the casing, (in the present example, it is one of the support diaphragms itself); and this diaphragm is so designed that it passes with a snap action from one of its end-positions to the other under the influence of the control pressure.

Figure 2:
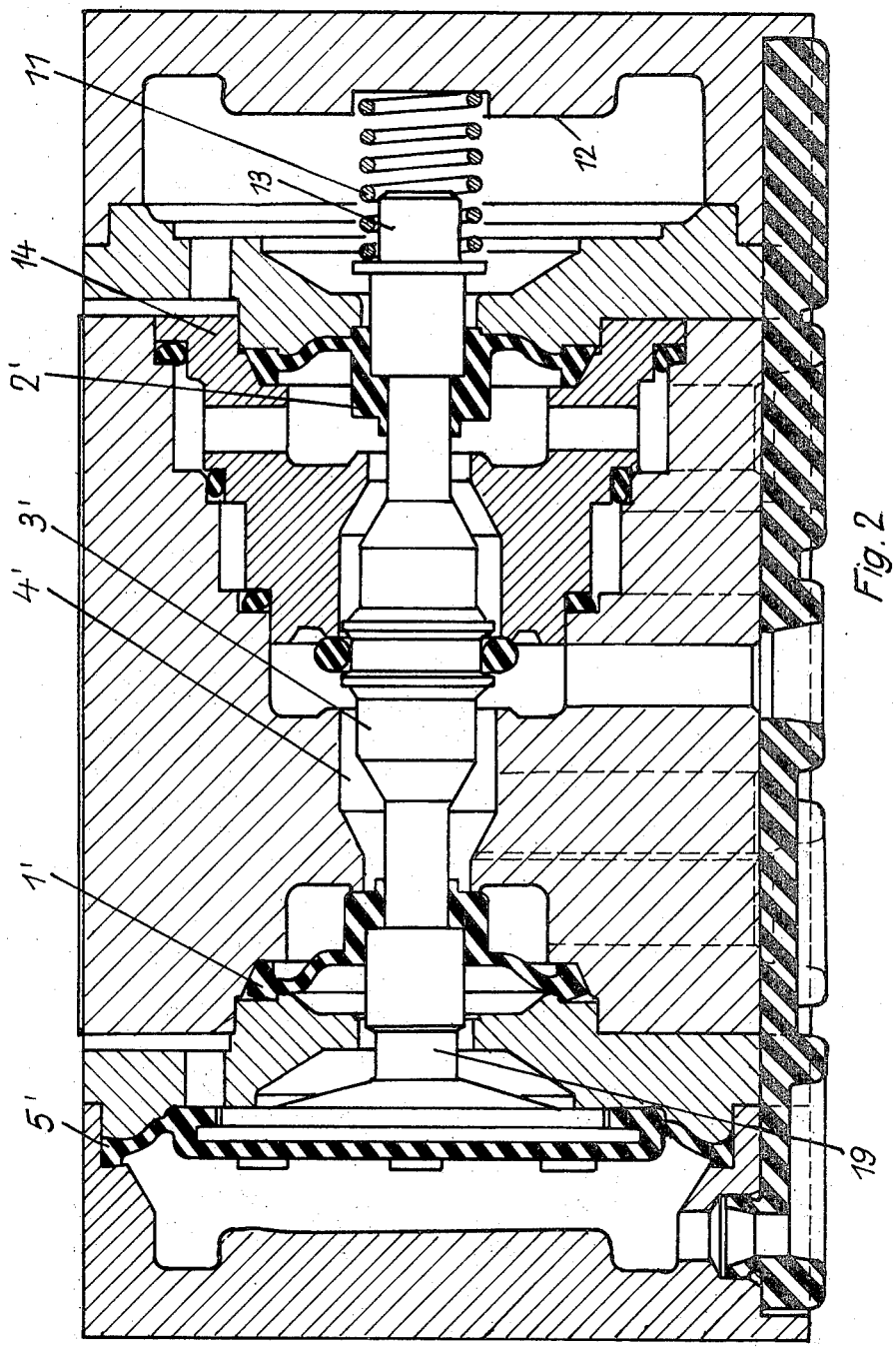
FIG. 2 shows an axial sectional view of a second embodiment according to the invention.

However, the arrangement can be such, as in FIG. 2 that a spool 3' of a five-way valve is supported by two diaphragms 1',2' within a bore 4', while a control diaphragm 5' is provided at one end only, and the other end of the closure member is supported by a spring 11 which can be designed for example as a compression spring and, preferably as shown, as a helical spring, which abuts at one end at 12 on the housing and engages at its other end a boss 13 on the adjacent end of the spool 3'. In this embodiment, the diaphragm 2', for example, can be dispensed with under certain circumstances, if additional guidance of the spool 3' is unnecessary. In this case, the sealing must be effected at one end of the spool 3' by special sealing rings, such, for example as indicated at 14.

Figure 3:
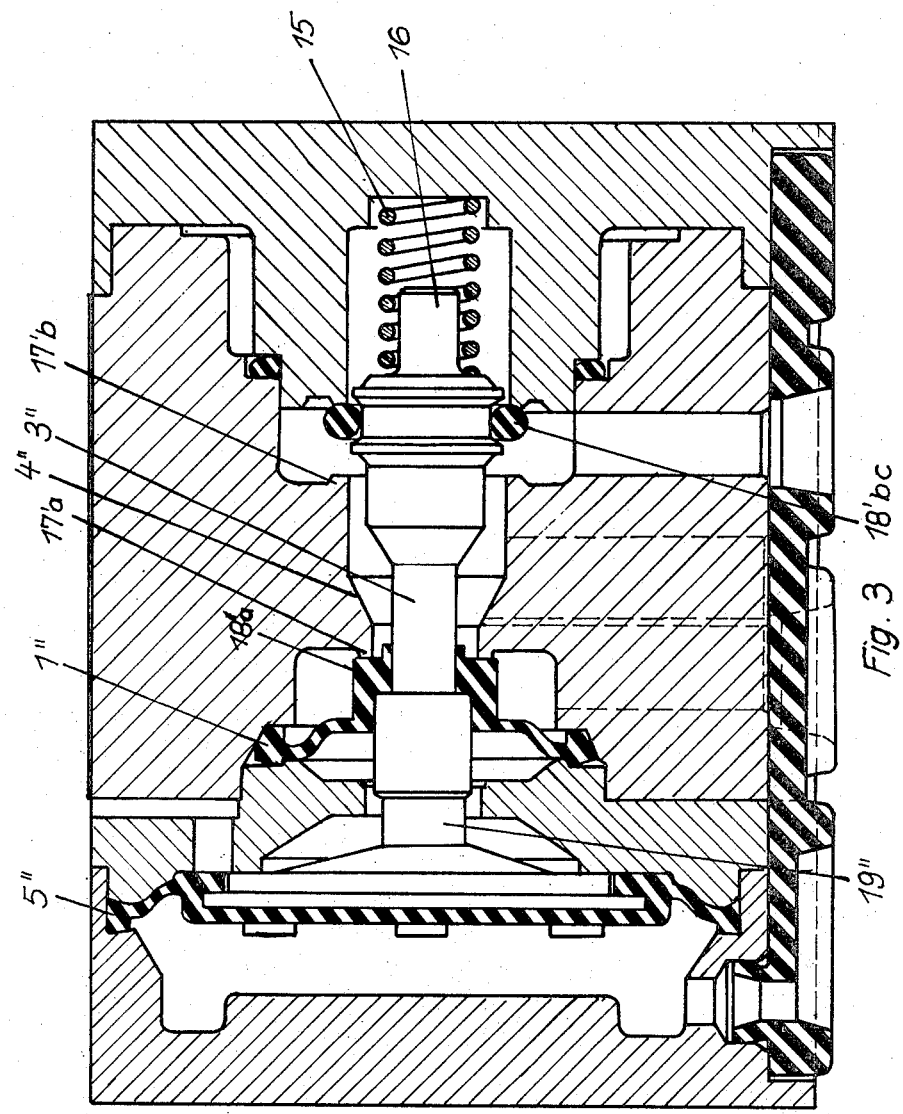
FIG. 3 shows an axial sectional view of a third embodiment according to the invention.

In a three-way valve, FIG. 3, a spool 3" is supported within a bore 4" adjacent one end by a support diaphragm 1". A control diaphragm 5" is also provided. At the other end, only compression spring 15 is provided to support the spool 3", the spring 15 engaging a boss 16 on the spool 3".

In the valves shown in FIGS. 1 and 2, four disc-valve seats 17a, 17b, 17c and 17d are associated with the spool, while the spool itself carries three sealing rings 18a, 18bc and 18d. In all these arrangements, the bore in the valve housing, when there are $n$ paths to be controlled by the valve, has $n - 1$ valve seats, surrounding the spool coaxially with a degree of play, while $n - 2$ sealing rings are mounted on the spool, one of the selaing rings (18bc) being designed as a double-seat closure member. In the embodiment shown in FIG. 3, on the other hand, two valve seats 17'a and 17'b are provided, and likewise two sealing rings 18'a and 18'bc; the latter being designed as a single-seat closure member.

In the above embodiments, each support diaphragm has associated with it a control diaphragm 5,5' or 5", which are attached at their outer circumference to the housing or to a part attached to the housing, and which serve to shut off the associated support diaphragm and the space surrounding the latter from the control pressure, and to actuate the spool under the influence of the control pressure. Conversely, the support diaphragms also serve to shut off the control diaphragms from the operational pressure in every position of the spool. The control diaphragms can be fixedly connected to the spool, or they may be loose, only engaging on the spool during switching. For this purpose, the central part of the control diaphragm carries, on its side facing the spool, a cylindrical boss 19,20 or 19' or 19", coaxial with the control diaphragm and with the spool, and directed towards the spool, the boss serving to actuate the spool. If the central part of the control diaphragm is fixedly connected to the spool, the arrangement is preferably such that the associated end of the spool is embedded in the diaphragm or is otherwise fixedly connected to it.

The diaphragms 1 and 2 are formed integrally with sealing rings 18a or 18d, respectively, the whole presenting the appearance of a sleeve, formed by the ring 18a or 18d, fixed to and surrounding the spool over a short length, and integral with a disc formed by the support diaphragm 1 proper said disc extending outwards more or less radially from the end of the sleeve facing the control diaphragm 5 or 6, the outer circumference of said disc being secured to the casing.

Annular members 21, 22 are provided, serving to secure the stretched diaphragms. In FIG. 1, the annular members 21, 22 are provided respectively between the associated diaphragms 1 and 2 and the associated control diaphragms 5 and 6; and they are axially immovably connected to the housing and the spool passes through them. The control diaphragms 5, 6 are, in this case, clamped between the members 21, 22 and closure caps 23, 24, provided at the extreme axial end of the housing. The diaphragms 1, 2 are held respectively between stepped portions 21a, 22a of the annular member, which are supported on the intermediate cylindrical housing 25, and projecting parts 25a, 25b of the housing 25. In this case, the space between diaphragms 1 and 5, and 2 and 6 is vented, the central bores 21b 22b of the annular members 21,22 having a larger diameter than the portions of the spool passing through them, and the members 21, 22 having evacuation channels 21c, 22c extending radially outwards.

As already mentioned, the diaphragms (at least one of the two diaphragms at each axial end of the spool) are so designed that they move with a snap action from one end-position to the other. For this purpose, the distance, measured radially, between the clamping zone on the housing for the outer circumference of the diaphragm, and the attachment zone of the diaphragm to the spool is smaller than the actual distance between the parts to be connected at the outer and inner circumferences, by such an amount that, in both end-positions, the diaphragm has an arcuate contour in cross-section and, on moving under the influence of a pulse, snaps over from one end-position to the other, passing through a dead-centre position. The sealing ring 18bc, formed as a double-seat closure member, is designed as an O-ring, and is located on a cylindrical portion of the spool defined by two annular collars 3a,3b, the axial extent of this cylindrical portion being greater than the width of the sealing ring, so that the latter can move to a small extent axially on the spool. The O-ring may, however, sit axially immovably relative to a cylindrical part of the spool between two collars.

The spool 3 is designed as a stepped, elongated cylindrical body, both of whose ends and whose middle portion carrying the sealing ring 18bc have a larger diameter than the intermediate portions connecting them respectively. In this case, the central bore 4 containing the spool 3 is provided in the housing 25.

In the embodiment shown in the drawing, the housing 25 has seven steps, firstly narrowing from one axial end to the other, carrying two of the four valve seats on the narrowed portion, and then gradually widening again conically. Naturally, the bore and also the spool can have other forms dependent upon the purpose envisaged, and on considerations of assembly of the parts. In order to simplify assembly, the widened part of the housing 25 has a likewise conically-shaped insert member 30, which has a central bore through which the spool passes, and which has both the other valve seats, one of the opposed valve seats, co-operating with the double-seat closure member, being provided on the housing 25, and the other on the insert member 30. The insert member 30 likewise has on its outer circumference several steps corresponding respectively with the steps on the central bore of the housing 25, and sealing elements, for example in the form of rings as shown, made of rubber or the like, the interposed between the steps which correspond to each other. The insert member 30, also has several bores extending radially from its central bores, the former leading to connecting bores in the housing 25, to one of the operational pipes, and to corresponding exhaust pipe. The insert member 30 enables considerable simplification of assembly, and avoids certain difficulties of manufacture which would otherwise arise.

Figure 4:
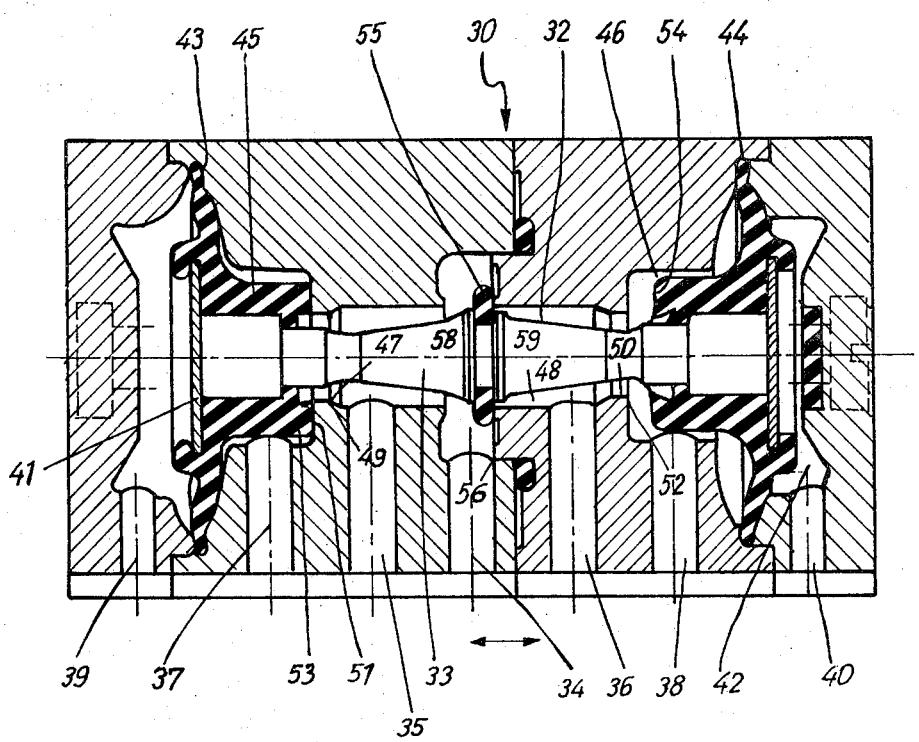
FIG. 4 shows an axial view of a fourth embodiment according to the invention.

The valve shown in FIG. 4 is designed as a five-way valve and has a valve housing 30, in whose central guide bore 32 a spool 33 is guided for axial movement to and fro. A connection 34 for pressure-medium supply is provided in the middle of the housing 30 while, seen from the medial region towards both axial ends, ports 35,36 respectively are provided for connection to operational pipes leading to consumer points and ports 37, 38 are provided for exhaust pipes associated with the respective consumer points. The spool 33 is moved by pulses of a pressure-medium, for example compressed air, the pressure-medium being supplied through control pipes 39 or 40 opening into chambers 41 or 42. At both axial end regions of the spool 33, there are provided respectively support diaphragms 43,44, for example in the form of a washer, whose inner circumferential face is attached to the outer circumferential face of the spool 33, while its outer circumferential marginal portion is clamped to the housing. Central parts of the diaphragms are respectively provided with hub-like hollow cylindrical bosses 45, 46, integral with the diaphragm, which engage the spool 33 and project towards the middle of the spool, far enough for them to close a connecting passage 47 between the ports 35 and 37, in the end-position to the left in FIG. 4, but to open a bore part 47 in its other end-position, while the boss 46 opens a bore part 48 between the pipes 36 and 38 in the first end-position of the spool 33, and closes it in the second end-position. In order to construct this in a particularly simple way, the walls 49, 50 of the bore parts 47 and 48 lying radially outwards, between the operational pipes and the exhaust pipes are axially stepped towards the exhaust pipes and radially stepped outwards, forming contact surfaces 51 and 52, extending at right angles to the slide's longitudinal axis, while the bosses of the diaphragms 45, 46 are closed-off on the frontal side facing the middle of the spool by frontal surface 53,54 extending roughly at right angles to the spools' longitudinal axis, the surfaces 53,54, in one end-position of the spool, bearing on the contact surface of the walls of the bore parts (i.e., to the left of the observer), thus closing off the operational pipe from the evacuation pipe.

In the middle, the spool has a single, annular sealing element 55, in the form of an O-ring which, in both end-positions of the spool, separates the respective operational pipe from the pressure-medium supply pipe 34.

The self-retaining capacity in the end-positions of the spool can be provided by magnetic force, which simultaneously provides a spring or jump function. For this purpose, small attracting magnets may be provided in the region of the chambers 41,42, holding the spool fast in its respective end-positions, pulses of a predetermined minimum strength being necessary to overcome their attractive force, these pulses then of course effecting a springing or jump acceleration of the slide into the other end-position.

We claim:

1. A multiway valve comprising a housing having a bore therein, a plurality of passages connecting the bore to the outside of the housing, and a plurality of valve seats within the housing located between the openings of the passages into the bore, a valve member comprising an elongated spool, means mounting said spool for movement within the bore longitudinally thereof, said spool having a plurality of seal means in the form of annular members having a sealing surface engageable with each of the valve seats spaced therealong at fixed distances apart, said mounting means including means mounting the spool to float in the bore out of frictional contact with the walls thereof and including diaphragm means adjacent one end of the spool secured to the housing and supporting the spool, said housing having a chamber therein of which said diaphragm means forms a wall, and means to conduct pressure fluid to said chamber, said diaphragm means including a diaphragm of the snap-action type, said valve having $n$ paths therethrough with $n-1$ valve seats and $n-2$ seal means, said diaphragm means including a first support diaphragm having its outer edge secured to the housing and its central portion attached to the spool and closing one end of the bore, and a first control diaphragm spaced from and on the side of the support diaphragm away from the bore forming a wall of said chamber, one of said annular members being integral with said support diaphragm.

2. A multiway valve comprising a housing having a bore therein, a plurality of passages connecting the bore to the outside of the housing, and a plurality of valve seats within the housing located between the openings of the passages into the bore, a valve member comprising an elongated spool, means mounting said spool for movement within the bore longitudinally thereof, said spool having a plurality of seal means in the form of annular members having a sealing surface engageable with each of the valve seats spaced therealong at fixed distances apart, said mounting means including means mounting the spool to float in the bore out of frictional contact with the walls thereof and including diaphragm means adjacent one end of the spool secured to the housing and supporting the spool, said housing having a chamber therein of which said diaphragm means forms a wall, and means to conduct pressure fluid to said chamber, said diaphragm means including a diaphragm of the snap-action type, said valve having $n$ paths therethrough with $n-1$ valve seats and $n-2$ seal means, said diaphragm means including a first support diaphragm having its outer edge secured to the housing and its central portion attached to the spool and closing one end of the bore, and a first control diaphragm spaced from and on the side of the support diaphragm away from the bore forming a wall of said chamber, the wall of the bore between two of said passages being stepped axially towards one of the passages and radially outwards, forming a contact surface at right angles to the axis of the valve member, which constitutes one of said valve seats, and a hollow cylindrical boss on the support diaphragm, on the side facing the middle of the spool, terminating in a frontal surface extending substantially at right angles to the longitudinal axis of the spool, said frontal surface, in one end-position of the valve member, bearing on the contact surface of the wall of the bore and thus closing off communication between two of said passages.

3. A multiway valve comprising a housing having a bore therein, a plurality of passages connecting the bore to the ouside of the housing, and a plurality of valve seats within the housing located between the openings of the passages into the bore, a valve member comprising an elongated spool, means mounting said spool for movement within the bore longitudinally thereof, said spool having a plurality of seal means in the form of annular members having a sealing surface engageable with each of the valve seats spaced therealong at fixed distances apart, said mounting means including means mounting the spool to float in the bore out of frictional contact with the walls thereof and including diaphragm means adjacent one end of the spool secured to the housing and supporting the spool, said housing having a chamber therein of which said diaphragm means forms a wall, and means to conduct pressure fluid to said chamber, said diaphragm means including a diaphragm of the snap-action type, said valve having $n$ paths therethrough with $n-1$ valve seats and $n-2$ seal means, one of said annular members being integral with said diaphragm means.

4. A multiway valve comprising a housing having a bore therein, a plurality of passages connecting the bore to the outside of the housing, and a plurality of valve seats within the housing located between the openings of the passages into the bore, a valve member comprising an elongated spool, means mounting said spool for movement within the bore longitudinally thereof, said spool having a plurality of seal means in the form of annular members having a sealing surface engageable with each of the valve seats spaced therealong at fixed distances apart, said mounting means including means mounting the spool to float in the bore out of frictional contact with the walls thereof and including diaphragm means adjacent one end of the spool secured to the housing and supporting the spool, said housing having a chamber therein of which said diaphragm means forms a wall, and means to conduct pressure fluid to said chamber, said diaphragm means including a diaphragm of the snap-action type, said valve having $n$ paths therethrough with $n-1$ valve seats and $n-2$ seal means, said mounting means including spring means supporting the end of the spool remote from the diaphragm means, the spring means comprising a helical compression spring which is supported at its one end on the housing and at its other end engages the valve member.

5. A multiway valve comprising a housing having a bore therein, a plurality of passages connecting the bore to the outside of the housing, and a plurality of valve seats within the housing located between the openings of the passages into the bore, a valve member comprising an elongated spool, means mounting said spool for movement within the bore longitudinally thereof, said spool having a plurality of seal means in the form of annular members having a sealing surface engageable with each of the valve seats spaced therealong at fixed distances apart, said mounting means including means mounting the spool to float in the bore out of frictional contact with the walls thereof and including diaphragm means adjacent one end of the spool secured to the housing and supporting the spool, said housing having a chamber therein of which said diaphragm means forms a wall, and means to conduct pressure fluid to said chamber, said diaphragm means including a diaphragm of the snap-action type, said valve having $n$ paths therebetween with $n-1$ valve seats and $n-2$ seal means, the diaphragm means being a single diaphragm formed integrally with one of said annular members and secured at its outer circumference on the housing, and engaging at its inner circumference on the spool and forming one wall of said chamber.

6. A multiway valve comprising a housing having a bore therein, a plurality of passages connecting the bore to the outside of the housing, and a plurality of valve seats within the housing located between the openings of the passages into the bore, a valve member comprising an elongated spool, means mounting said spool for movement within the bore longitudinally thereof, said spool having a plurality of seal means in the form of annular members having a sealing surface engageable with each of the valve seats spaced therealong at fixed distances apart, said mounting means including means mounting the spool to float in the bore out of frictional contact with the walls thereof and including diaphragm means adjacent one end of the spool secured to the housing and supporting the spool, said housing having a chamber therein of which said diaphragm means forms a wall, and means to conduct pressure fluid to said chamber, said diaphragm means including a diaphragm of the snap-action type, said valve having $n$ paths therebetween with $n-1$ valve seats and $n-2$ seal means, the bore being stepped and, seen from one axial end to the other, firstly narrowing, then gradually widening conically, the widened part of the central portion of the housing containing an insert member of a generally conical shape having connecting passages leading to the bore, said member having a central bore through which the valve member passes, and which includes two valve seats, an O-ring mounted on the spool, the opposed faces of said O-ring constituting two of said seal means and being engageable with one valve seat provided on the housing, and with one on the insert member.

* * * * *